US010261922B2

(12) United States Patent
Ratilla et al.

(10) Patent No.: US 10,261,922 B2
(45) Date of Patent: Apr. 16, 2019

(54) FIELD DEVICE COMMISSIONING SYSTEM AND FIELD DEVICE COMMISSIONING METHOD

(71) Applicant: Yokogawa Electric Corporation, Tokyo (JP)

(72) Inventors: Jasper Bryan Sale Ratilla, Singapore (SG); Grewin Vidallo Sesma, Singapore (SG); Kristine Acibar Yap, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 15/618,206

(22) Filed: Jun. 9, 2017

(65) Prior Publication Data
US 2018/0357185 A1   Dec. 13, 2018

(51) Int. Cl.
| | |
|---|---|
| G06F 13/10 | (2006.01) |
| G05B 19/04 | (2006.01) |
| G06F 9/44 | (2018.01) |
| G05B 19/042 | (2006.01) |
| G06F 9/4401 | (2018.01) |
| G05B 19/048 | (2006.01) |

(52) U.S. Cl.
CPC ....... *G06F 13/102* (2013.01); *G05B 19/0423* (2013.01); *G06F 9/4411* (2013.01); *G05B 19/048* (2013.01); *G05B 2219/25428* (2013.01)

(58) Field of Classification Search
CPC .............. G06F 13/385; G06F 11/3485; G05B 19/0426; G05B 2219/25428; G05B 2219/25068

USPC .......................................................... 710/18
See application file for complete search history.

(56) References Cited

U.S. PATENT DOCUMENTS 9,719,887 B2 * 8/2017 Ratilla .............. G05B 19/0426
9,830,216 B2 * 11/2017 Nguyen ............ G06F 11/0793
(Continued)

FOREIGN PATENT DOCUMENTS

| EP | 3012697 A1 | 4/2016 |
|---|---|---|
| EP | 3065010 A2 | 9/2016 |

OTHER PUBLICATIONS

Emerson—"DeltaV Distributed Control System—Smart Commissioning" White Paper, 9 pages, Dated Feb. 2016 (Year: 2016).*

*Primary Examiner* — Brian T Misiura
(74) *Attorney, Agent, or Firm* — Sughrue Mion, PLLC

(57) ABSTRACT

A field device commissioning system includes a commissioning tool, a communication module and an IO module. The commissioning tool is configured to communicate with a client in a plurality of communications. The commissioning tool is configured to perform a parallel execution of executing a plurality of loop processing logics that includes at least one input loop check or at least one output loop check in parallel for all of a plurality of channels which belongs to each slot in each unit, in accordance with the plurality of request for executions of loop checks from the client in the plurality of communications. The commissioning tool is configured to perform in series a plurality of the sequential executions for a plurality of the slots in each unit, wherein each execution including the plurality of loop processing logics. The commissioning tool may be configured to perform in series a plurality of sets of the plurality of the sequential execution for a plurality of the units.

19 Claims, 11 Drawing Sheets

(56) References Cited

U.S. PATENT DOCUMENTS

| | | | | |
|---|---|---|---|---|
| 9,851,707 B2* | 12/2017 | Hokeness | ......... | G05B 19/0426 |
| 9,921,569 B2* | 3/2018 | Alexander | ......... | G05B 19/401 |
| 2011/0310621 A1* | 12/2011 | Van Der Stok | .... | H05B 37/0254 |
| | | | | 362/311.12 |
| 2014/0352408 A1 | 12/2014 | Tharaldson et al. | | |
| 2015/0066162 A1* | 3/2015 | Hokeness | ......... | G05B 19/0426 |
| | | | | 700/28 |
| 2015/0233790 A1* | 8/2015 | Ratilla | ............. | G05B 19/0426 |
| | | | | 702/188 |
| 2015/0233791 A1* | 8/2015 | Ratilla | ............. | G05B 19/0423 |
| | | | | 702/188 |
| 2015/0234381 A1* | 8/2015 | Ratilla | ............. | G05B 19/0426 |
| | | | | 702/104 |
| 2016/0338170 A1* | 11/2016 | Lebel | ............... | H05B 33/0857 |
| 2018/0024519 A1* | 1/2018 | Peluso | ............... | G05B 19/048 |
| 2018/0101152 A1* | 4/2018 | Jundt | ................. | G05B 19/041 |

* cited by examiner

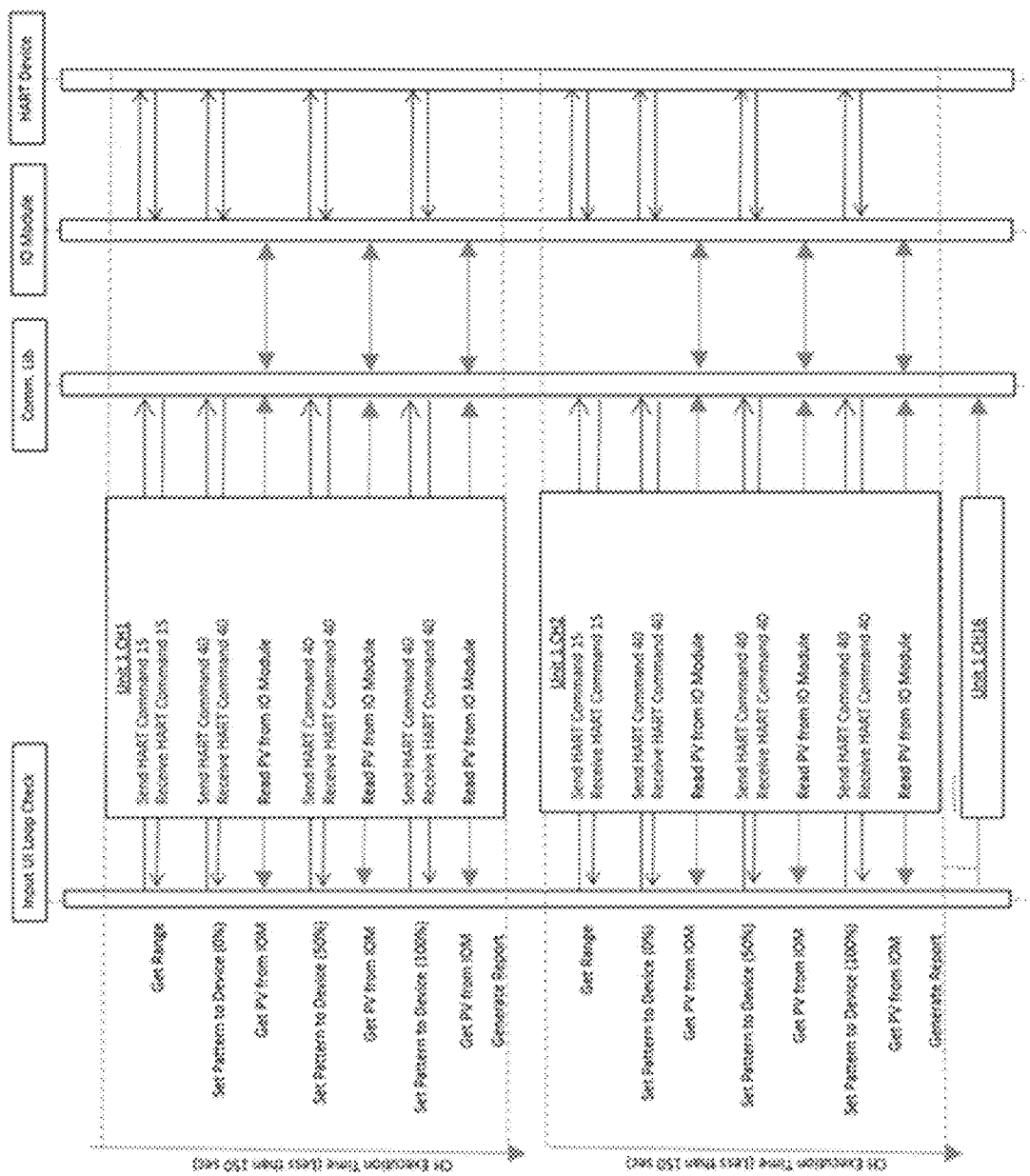

FIELD DEVICE COMMISSIONING SYSTEM AND FIELD DEVICE COMMISSIONING METHOD

TECHNICAL FIELD

The disclosure of the invention generally relate to a field device commissioning system and a method of commissioning a field device in an industrial plant.

BACKGROUNDS

In an industrial plant, field devices, such as instruments or transmitters, are used to obtain process variables from industrial process and other devices or equipment than field device, such as Rotating Equipment. Many systems are configured to control or monitor these field devices to ensure proper functioning of the field devices. These systems are configured to communicate with the field devices through an input-output (IO) module. The IO module is configured to communicate with a plurality of field devices and systems in the plant.

Commissioning is a process for testing equipment, the IO module and the field devices connected to the IO module. Commissioning may include different works or activities to verify if equipment, the IO modules and the field devices function according to those design objectives or specifications. One of these works or activities is testing or validation. Testing works or activities could be further break down into smaller identifiable units of works or acts. These smaller identifiable units can be predetermined into two groups: IO module check and field device check, targeting at the IO module and the field device, respectively. Check functions of the IO module check and the field device check aim to automate execution of testing or validation of the IO modules and the field devices connected to the IO modules based on respective configurations of the IO modules and the field devices. Types of the check functions are as follows.

IO Module Input and Output Check

IO module is configured by downloading its design specification. This check is a test to verify specification for each channel which is the information downloaded to each channel.

The function of IO Module Input and Output Check is also to measure the precision of input and output of the IO module. Precision of input and out of IO module is measured by tolerance level. Tolerance level is a difference between data written to and read from the IO module. The smaller the tolerance level, more precise is the input and out of the IO module. When the IO module is configured dual-redundant, each side of the IOM is checked respectively.

The following are types of the IO module Input Output check:

IOM Input Check-refers to a check function that tests the precision of Input (analog or digital) of the IOM IOM Output Check-refers to a check function that tests the precision of output (analog or digital) of the IOM Device Input and Output Check The Device Input and Output Check is to confirm that the field device operates correctly and is within the acceptable range in precision by giving actual signals or simulated input and output signals.

In an operating plant, field devices measure actual process variables (for example, temperature), or respond to actual commands received from an operator or control system. During commissioning stage, a plan is not in operation. Thus, there is no physical environment for field device to measure the process variables. For the purpose of checking and commissioning, field devices are set in a simulated environment and a simulated signal or command is given to the device.

There are two device loops, for example, a device input loop and a device output loop. The device input loop is a connection between an input device and the IOM and the device output loop is another connection between the IOM and output device.

The following are types of field device check:

Manual check-refers to a check function that allows a user to create instructions for tasks that cannot be automated by tools. Physical effort or action is required.

Connection check-refers to a check function that determines the connection and the physical locations of field devices in a plant.

HART input loop check-refers to a check function that evaluates if signals between "an input field device" and "an IO module" are correctly transmitted. In device input loop check, signals are sent to field devices through an IOM and the field device will generate a corresponding signals to the IOM. Deviation of the two signals is compared with a predefined threshold (tolerance level). If the deviation is within the threshold, then, the signal is correctly transmitted. If the deviation is greater than the threshold, the signal is incorrectly transmitted.

HART output loop check-refers to a check function that evaluates if the signals between "an output field device" and "an IO module" are correctly transmitted.

For testing of signals transmitted between the IO module and the field devices for each commissioning task, at least two persons, a field operator and a control room operator, have to be in close communication with each other during the commissioning process in a conventional method.

FIG. 1 illustrates a conventional method for field device Input Loop Check. A control room operator sends a simulated signal (e.g. a temperature value) to an input field device (e.g. a temperature sensor) through an IO module. The value is written to the field device and transmitted to an IO module. Another operator uses a calibrator to read the transmitted signal from the IO module. Difference between the two signals is computed. If the difference is within a predefined threshold, then signal is correctly transmitted.

FIG. 2 illustrates a conventional method for field device Output Loop Check. A control room operator sends a command to an output field device (e.g. a valve) through an IO module. The output field device responds to the command (e.g. valve position) and sends a corresponding signal to the IO module. Another operator uses a calibrator to read the transmitted signal from the IO module. Difference between the two signals is computed. If the difference is within a predefined threshold, then signal is correctly transmitted.

FIG. 3 shows how series of Input and Out Loop checks are executed. While multiple commissioning signals are sent to the IO module or the field devices, a method for executing a series of input and output Loop checks involves multiple users to coordinate and test the field devices one by one at a time in sequential order.

In a typical plant, there are hundreds or thousands of field devices, in which commissioning is a tedious process and requires a lot of manpower and time. There is a need for an improved method and system for performing input and output loop check for the field devices.

A recently developed smart configurable IO module (SCIO) is capable to support multiple channels and to toggle analog/digital input/output functions for each channel. By supporting multiple channels, multiple commissioning signals can be transmitted through the SCIO in parallel, instead of one by one. This function of the parallel transmission of multiple commissioning signals for the multiple channels allows fast execution of field device input and output loop checks.

A new system and method for fast and convenient execution of field device input and output loop checks is disclosed herein by using a smart configurable IO module.

BRIEF DESCRIPTION OF THE DRAWINGS

FIGS. 8A and 8B show field device loop check execution logics for input loop check and output loop check respectively according to some embodiment of the invention.

DETAILED DESCRIPTIONS

Figure 1:
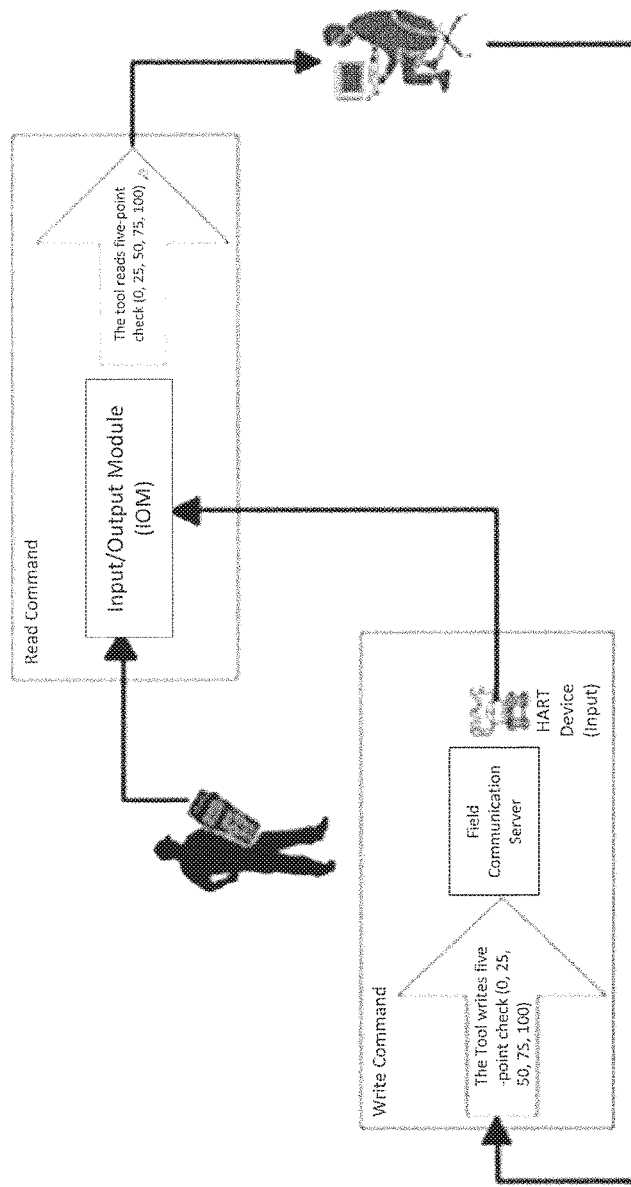
FIG. 1 is a schematic view of a configuration of a field device input loop check execution.
Figure 2:
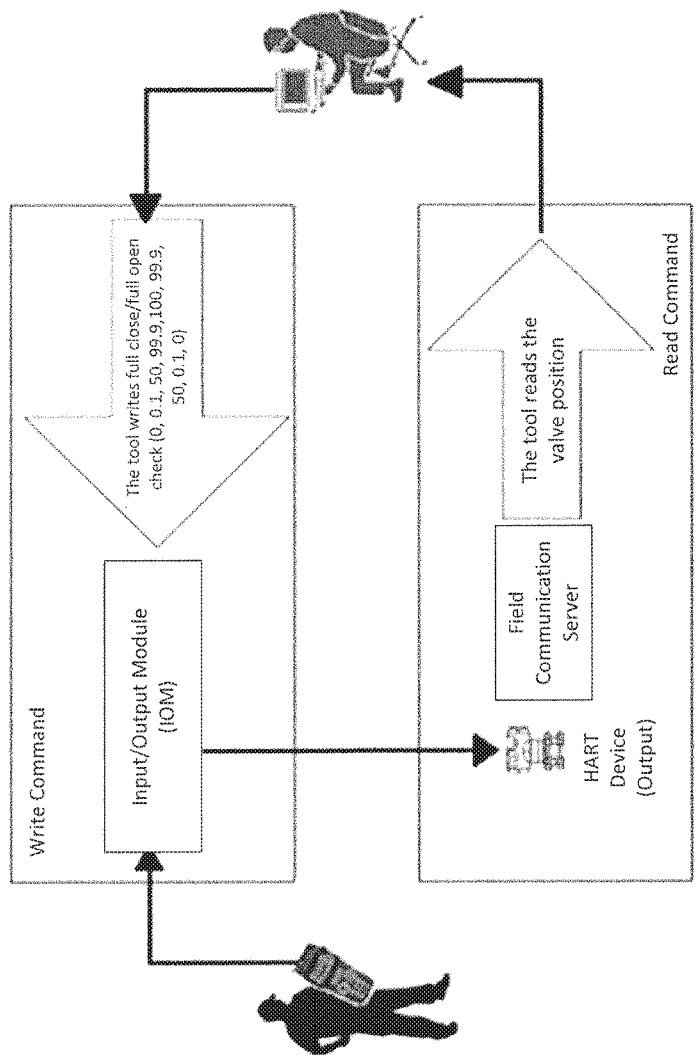
FIG. 2 is a schematic view of a configuration of a field device output loop check execution.
Figure 3:
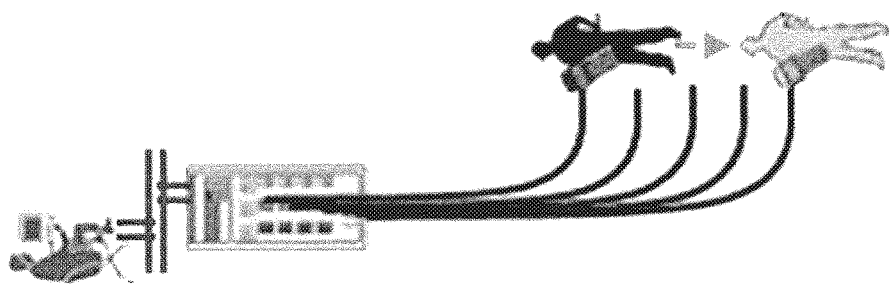
FIG. 3 is a schematic view of an execution of a field device input and output loop check.

In some embodiments, a computer-implemented commissioning system may include, but is not limited to, a commissioning tool, a communication module, and an IO module. The commissioning tool may be configured to communicate with a client. The commissioning tool may be configured to perform a parallel execution of executing a plurality of loop processing logics that includes at least one input loop check or at least one output loop check in parallel for all of a plurality of channels which belongs to each slot in each unit in accordance with a plurality of requests for executions of loop checks from the client. The commissioning tool may be configured to perform in series a plurality of the sequential executions for a plurality of the slots in each unit, wherein each execution including the plurality of loop processing logics. The commissioning tool may be configured to perform in series a plurality of sets of the pluralities of the sequential executions for a plurality of the units. The IO module may be configured to communicate with the commissioning tool in a series communication, the IO module configured to communicate with a plurality of field devices in a series communications.

In some embodiments, the commissioning tool may be configured to perform the parallel execution for each slot by generating a set of data for each slot and send a plurality of sets of the data in series to the IO module. The IO module may be configured to send the plurality of sets of the data in parallel to the plurality of field devices.

In some embodiments, each of the at least one input loop check or the at least one output loop check for each channel may include: setting a first pattern to the field device; obtaining a first process variable (PV) from the IO module after setting the first pattern; setting a second pattern to the field device after obtaining the first PV; obtaining a second PV from the IO module after setting the second pattern; setting a third pattern to the field device after obtaining the second PV; and obtaining a third PV from the IO device after setting the third pattern.

In some embodiment of the system, a loop check task is a task performed to a channel.

Embodiments of the system may also include computing a difference between each of the patterns set to the field devices and their corresponding PVs obtained from the module, determining a check status of each of the patterns by comparing the difference with a predefined threshold. In addition, the status is PASS when the difference is not greater than the predefined threshold, and the status is FAIL when the difference is greater than the predefined threshold.

In some embodiment, the predefined threshold can be a default value or can be configured by a user when a loop check task is generated and before execution of the task.

Also, the system may further include determining that when the statuses for all the execution patterns are PASS, status for the loop check task for the channel is PASS; and when at least one of the statuses for the execution patterns is FAIL, the status for the loop check task for the channel is FAIL.

Embodiments of the system may further include determining a judgement time by comparing time between setting a pattern to the field device and obtaining the corresponding PV from IO module with a predefined threshold; and determining the status for the execution pattern to be PASS when judgement time is not greater than the predefined threshold; and determining the status for the execution pattern to be FAIL when judgement time is greater than the predefined threshold.

Furthermore, the system may generate a notification on a user interface when the loop check task status is determined to be FAIL.

Also, embodiments of the method may include generating an execution report, includes loop check task status, and at least one of, task information, field device information, IO module information and execution information.

In some embodiment, the system may further include importing and downloading configuration to IO modules, creating configured input and output loop check task and comparing IO module list with field device tags.

Embodiments of the disclosure, a computer-implemented commissioning method, may include: communicating with a client by a communication module; receiving a plurality of requests for executions of loop checks from the client; performing by the commissioning tool, a parallel execution of executing a plurality of loop processing logics that includes at least one input loop check or at least one output loop check in parallel for all of a plurality of channels which belongs to each slot in each unit, in accordance with the plurality of requests; performing by the commissioning tool, in series a plurality of sequential executions for a plurality of the slots in each unit, wherein each execution including the plurality of loop processing logics; performing, by the commissioning tool, in series a plurality of sets of the plurality of sequential executions for a plurality of the units; communicating, by an IO module, with the commissioning tool in a series communications; communicating, by the IO module, with the plurality of field devices in a series communications.

Embodiments of the commissioning method may further include performing by the commissioning tool, the parallel execution for each slot; generating a set of data for each slot; sending a plurality of sets of the data in series to the IO module; sending by the IO module, the plurality of sets of the data in parallel to the plurality of field devices.

In addition, embodiments of the method include setting a first pattern to the field device; obtaining a first process variable (PV) from the IO module after setting the first pattern; setting a second pattern to the field device after obtaining the first PV; obtaining a second PV from the IO module after setting the second pattern; setting a third pattern to the field device after obtaining the second PV; and obtaining a third PV from the IO module after setting the third pattern.

In some embodiment, a loop check task is a task performed to a channel.

Also, some embodiments of the commissioning method include computing a difference between each of the patterns set to the field device and their corresponding PVs obtained from the IO module; determining a status for each of the execution patterns by comparing the difference with a predefined threshold; determining the execution status to be PASS when the difference is not greater than the predefined threshold; determining the execution status to be FAIL when the difference is greater than the predefined threshold.

In addition, the commissioning method may include determining a judgement time by comparing a judgement time by comparing time between setting a pattern to the field device and obtaining a corresponding PV from IO module with a predefined threshold; determining the status for the execution pattern to be PASS when judgement time is not greater than the predefined threshold; determining the status for the execution pattern to be FAIL when judgement time is greater than the predefined threshold.

Embodiments further include determining status for the loop check task is PASS when the statuses for all the execution patterns are PASS; and determining status for the loop check task is FAIL when at least one of the statuses for all the loop check patterns is FAIL.

In addition, the predetermined threshold can be a default value or can be configured by a user when a loop check task is generated and before execution of the task.

Some embodiments of the method may also include generating a notification on a user interface when the loop check task status is determined to be FAIL.

Some embodiments of the method may include generating an execution report, including loop check task status, and at least one of task information, field device information, IO module information and execution information.

One or more embodiments of the method may also include importing and downloading configuration to IO module, creating input and output loop check task and comparing IO module list and field device tags.

A non-transitory computer readable storage medium that stores a computer-readable program which, when executed by one or more computers, causes the one or more computers to perform a method. It method comprises communicating with a client by a commissioning tool; receiving a plurality of requests for execution of a plurality of loop checks from the client; performing by the commissioning tool, a parallel execution of executing a plurality of loop processing logics that includes at least one input loop check or at least one output loop check in parallel for all of a plurality of channels which belongs to teach slot in each unit, in accordance with the plurality of requests; performing, by the commissioning tool, in series a plurality of sequential executions for a plurality of the slots in each unit, wherein each execution including the plurality of loop processing logics; performing, by the commissioning tool, in series a plurality of sets of the pluralities of the sequential executions for a plurality of the units; communicating, by the IO module, with the commissioning tool in series communication; communicating, the IO module, with the plurality of field devices in series communication.

Figure 4:
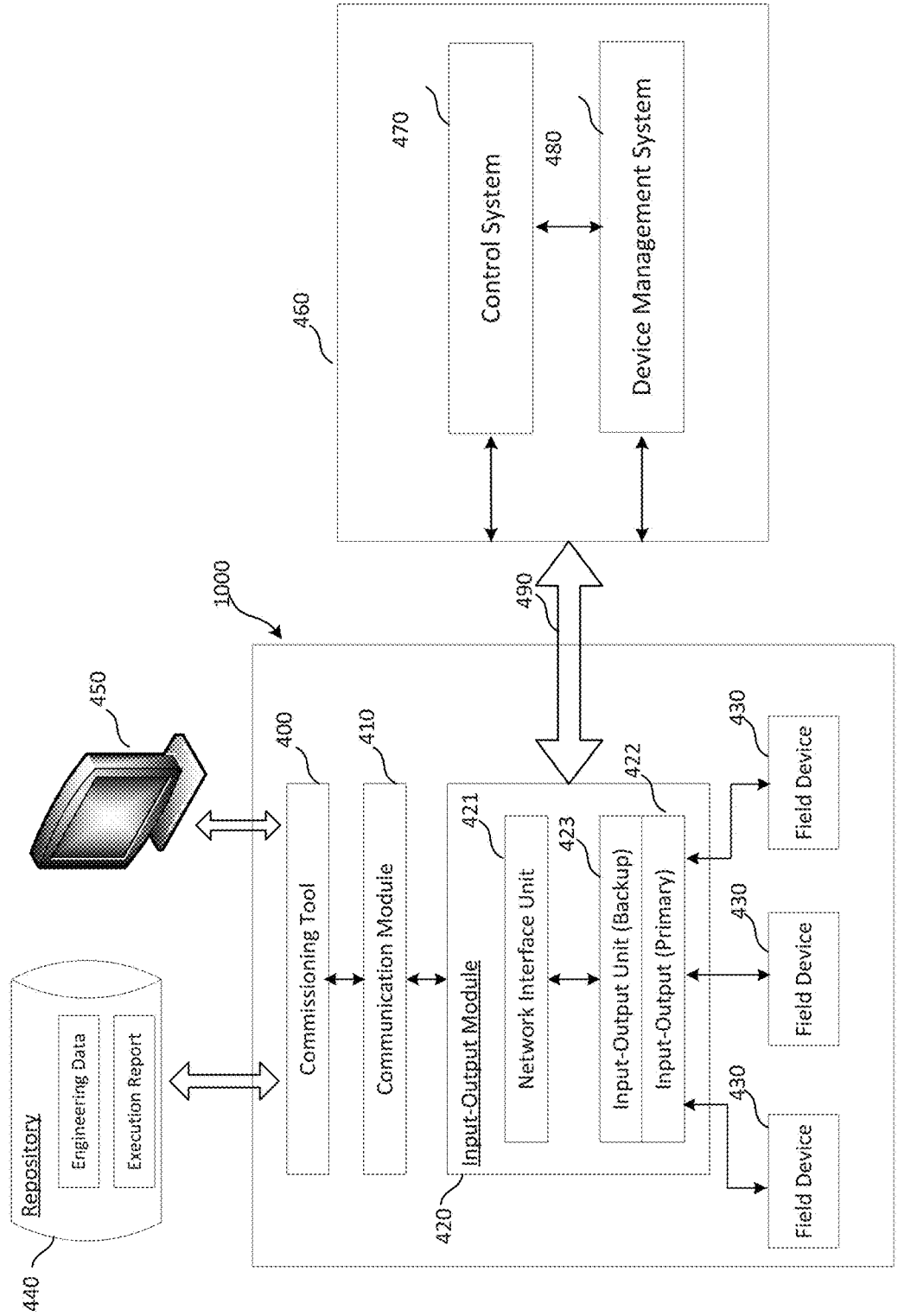
FIG. 4 is a block diagram of a plant system including a commissioning tool according to some embodiments of the invention.

An example of a configuration of a field device commissioning system 1000 for an industrial plant is illustrated in FIG. 4. The field device commissioning system may include, but is not limited to, a commissioning tool 400, a communication module 410, an input-output (IO) module 420, field devices 430, a repository 440, and a user interface 450. The commissioning tool 400 may be implemented by a processor and a memory storage for performing commissioning task to check that the field devices 430 are configured correctly according to design specifications.

The design specifications are stored in the repository 440 as an engineering data. An example of the engineering data may be, but is not limited to, an IO list which includes the field devices 430, the IO module 420, and their configuration data. The configuration data represent respective properties or configuration parameters of the field devices 430, the IO module 420 and the values. Examples of the configuration parameters for the IO module 420 are "signal type" which is a type of input or output which is processed by a channel in the IO module 420; and "node number" which identifies the IO module 420. Field device loop check patterns are also stored in the repository 440. Examples of the loop check patterns may be, but are not limited to, "positions 0%, 50% and 100%" if the field device is a valve, and "27° C." if the field device is a temperature sensor. Execution information and results are also stored in the repository 440 as an execution report. These patterns are set to the field devices 430 during the field device loop check execution. The execution report includes loop check task status, and at least one of, task information, field device information, IO module information and execution information. The execution report is generated after all the tasks are completed and then the report can be stored in the repository or any other storages.

The IO module 420 may include, but is not limited to, a processor, a memory storage, a network interface unit 421, and an IO unit 422. According to some embodiments of the invention, there are two IO units, for example, a primary IO unit 422, and a backup IO unit 423. The IO module is configured to be connected to a bus 490 for communication with a field network 460. Other systems in the industrial plant such as a control system 470 and a device management system 480 may be connected to the bus 490. The network interface unit 421 is configured to support at least one direct connection to the communication module 410 and at least one separate direct connection to the bus 490. The direct and separate connections are independent of each other.

The commissioning tool 400 has a processor that is configured to retrieve from the repository 440 engineering data which is relevant for the IO module 420 or the field devices 430. The engineering data is design data for the industrial plant to operate according to predefined design specifications. The relevant engineering data may be in a configuration file according to some embodiments of the invention. The relevant engineering data is downloaded and temporary stored in the memory storage of the commissioning tool when the commissioning task is running.

The processor of the commissioning tool is also configured to retrieve the configuration data from the IO module 420 through the communication module. The configuration data may include, but is not limited to, configuration parameters for the IO module 420 and configuration parameters for the field devices 430. The configuration data is retrieved by the processor of the IO module 420 from the IO units 422, 423 and the field devices 430 and then transmitted to the communication module and then passed to the processor of the commissioning tool 400 according to some embodiments of the invention.

The communication module 410 is configured to communicate between the commissioning tool 400 and the IO module 420. The communication module 410 is configured to convert the engineering data retrieved from the repository 440 to machine readable data. The machine readable data is downloaded to the IO module 430 for configuration. The communication module is also configured to convert field device information and the process variables transmitted from the field devices 430 to user data.

Figure 5:
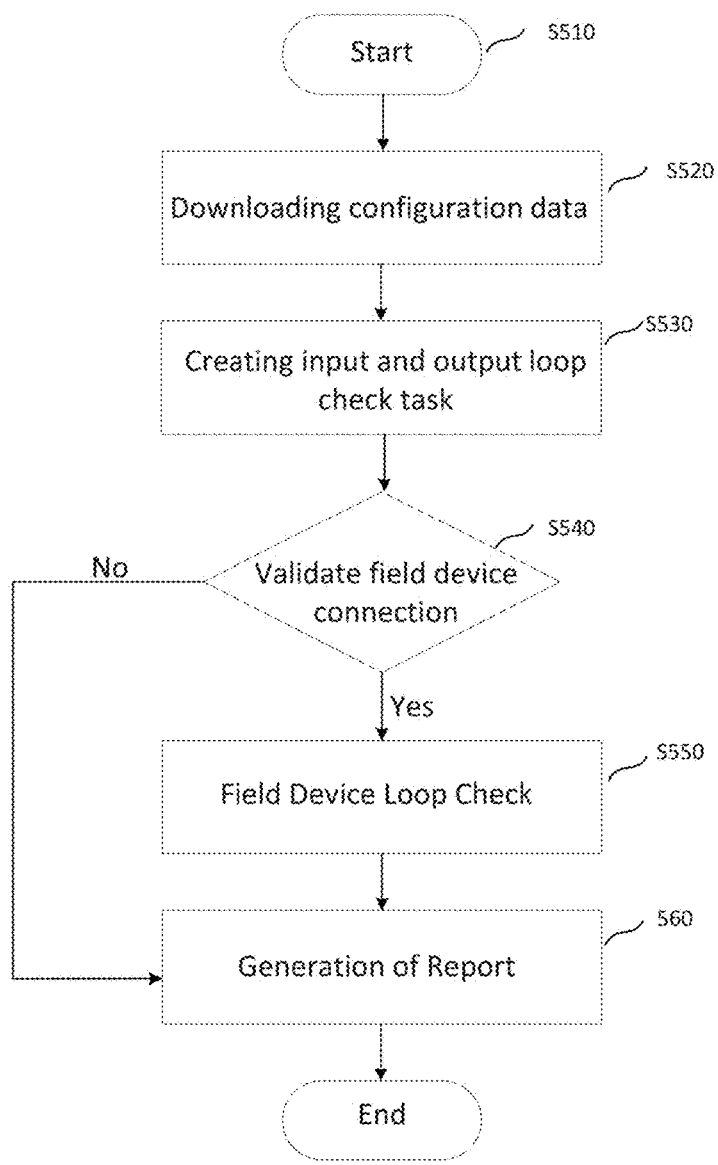
FIG. 5 is a flow chart of an example of a loop check process according to some embodiments of the invention.

FIG. 5 illustrates a field device loop check workflow according to some embodiments. In Step S520, a user, such as a control room operator, can operate the commissioning tool 400 to configure the IO module 420 in Step S520. The commissioning tool 400 downloads configuration data to the IO module from the repository 440. The IO module configuration data can be changed or modified by the user before downloading to the IO module. Examples of the configuration parameters for the IO module 420 are "signal type" which is type of input or output which is processed by a channel in the IO module 420; and "node number" which identifies the IO module 420.

In Step S530, the user creates loop check task for selected field devices by selecting the relevant channels. Each channel connects to a field device 430. All available channels are listed in a tree view by a loop check scheduler on the user interface 450 to allow the user to select the channels for loop checks that the user will execute from the channel list.

According to some embodiments of the invention, the selected list of channels can be grouped into slots. Each slot can have a maximum of 16 channels. Each unit can have one or more slots depending on the configuration of the IO module 430. In some other embodiments, there are two IO units in an IO module. One is a primary IO unit and another is a backup IO unit. In such embodiment, each unit can have two slots.

After the loop check tasks are created, the process goes to Step S540 in which the commissioning tool 400 validates if each of the field devices 430 is connected with a respective one of the selected channels, independently of each other. The commissioning tool 400 retrieves an IO list from the repository 440 for the selected channels. The IO list provides information which identifies the field devices 430 that are connected to the selected channels. The commissioning tool 400 retrieves at least one property from each of the field devices 430 which are connected with the selected channels, to check if the commissioning tool 400 can communicate with the field devices 430 and if the selected channels and field devices are connected correctly. The commissioning tool 400 needs to retrieve at least one property but does not necessarily need to retrieve more property even the commissioning tool 400 may retrieve more property. In some cases, the commissioning tool 400 may be configured to stop retrieve more property once the commissioning tool 400 did retrieve at least one property. Each field device tag represents one of the at least one property retrieved from a respective one of the field devices. The commissioning tool 400 is configured to compare the at least one retrieved property from the field device with the field device tag on the IO list imported from the repository 440 by the commissioning tool 400, to determine whether the at least one retrieved property is matched with any one of the field device tags on the IO list for each channel. If the commissioning tool 400 determined that the at least one retrieved property is mismatched with all of the field device tags on the IO list for the channel, then the commissioning tool 400 does not perform the loop check task which has been already created for the channel. In this case, the loop check for the channel is not executed and a result of the execution is set to be FAIL in the execution report. If the commissioning tool 400 determined that the at least one retrieved property is matched with at least one of the field device tags on the IO list for the channel, then the commissioning tool 400 performs the loop check task which has been created for the channel. This process for controlling the performance to the loop check task is made on each channel independently.

In some embodiments, the IO list is updated with field device tags and other information.

After the commissioning tool 400 determined that the at least one retrieved property is matched with at least one of the field device tags on the IO list for the channel, the loop check tasks are performed in Step S550 by selecting a loop check option, preferably a high-speed, or fasten loop check, called Quick Loop Check, from the context menu on the user interface 450. In this step, within each of the slots, all the channels are executed in parallel at the same time. Quick Loop Check function is supported by task parallel library (TPL). TPL is a function to enable multi-threading. One threading is corresponding to one channel. When a plurality of loop check tasks are created at the same time, parallel-processing for performing the plurality of loop check tasks for a maximum of 16 channels can be executed in parallel by the commissioning tool 400. When there are two slots in a unit, the two slots are executed in sequential order. Slot 1 is completed before starting of slot 2 execution. When there are a plurality of units, executions of a plurality of units are in sequential order. According to some embodiments, the execution for loop check may optionally be aborted or skipped during execution.

An execution report is generated after the loop check task which has been created is completed in Step S560. The execution report, includes loop check task status, and at least one of loop check task statuses, task information, field device information, IO module information and execution information.

Figure 6A:
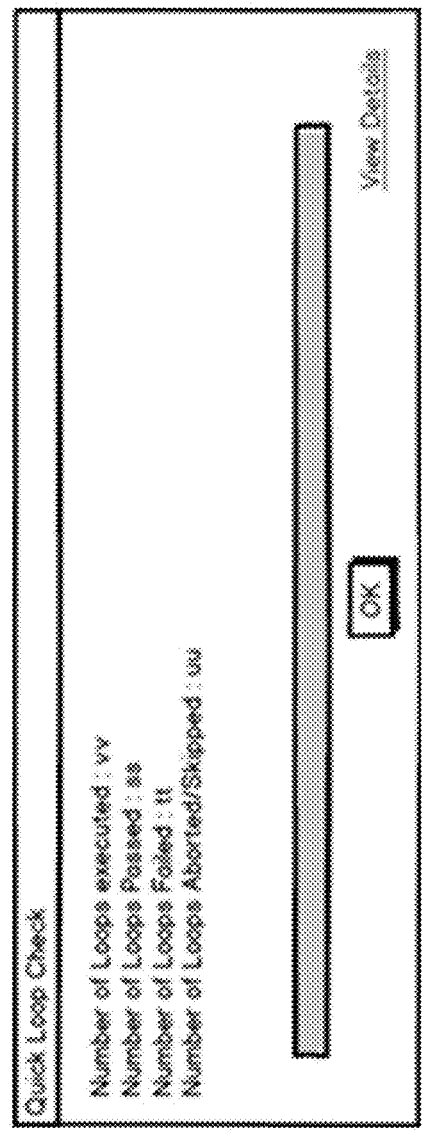
FIG. 6A is a view of an example of a display screen for execution report.

According to some embodiments, the execution report is shown on the user interface 450 as a summary page like shown in FIG. 6A, summarizing No. of loops already executed, No. of loops passed, No. of loops Failed, and No. of loops aborted or skipped. And a detailed report is shown by clicking "View Detail" button.

Figure 6B:
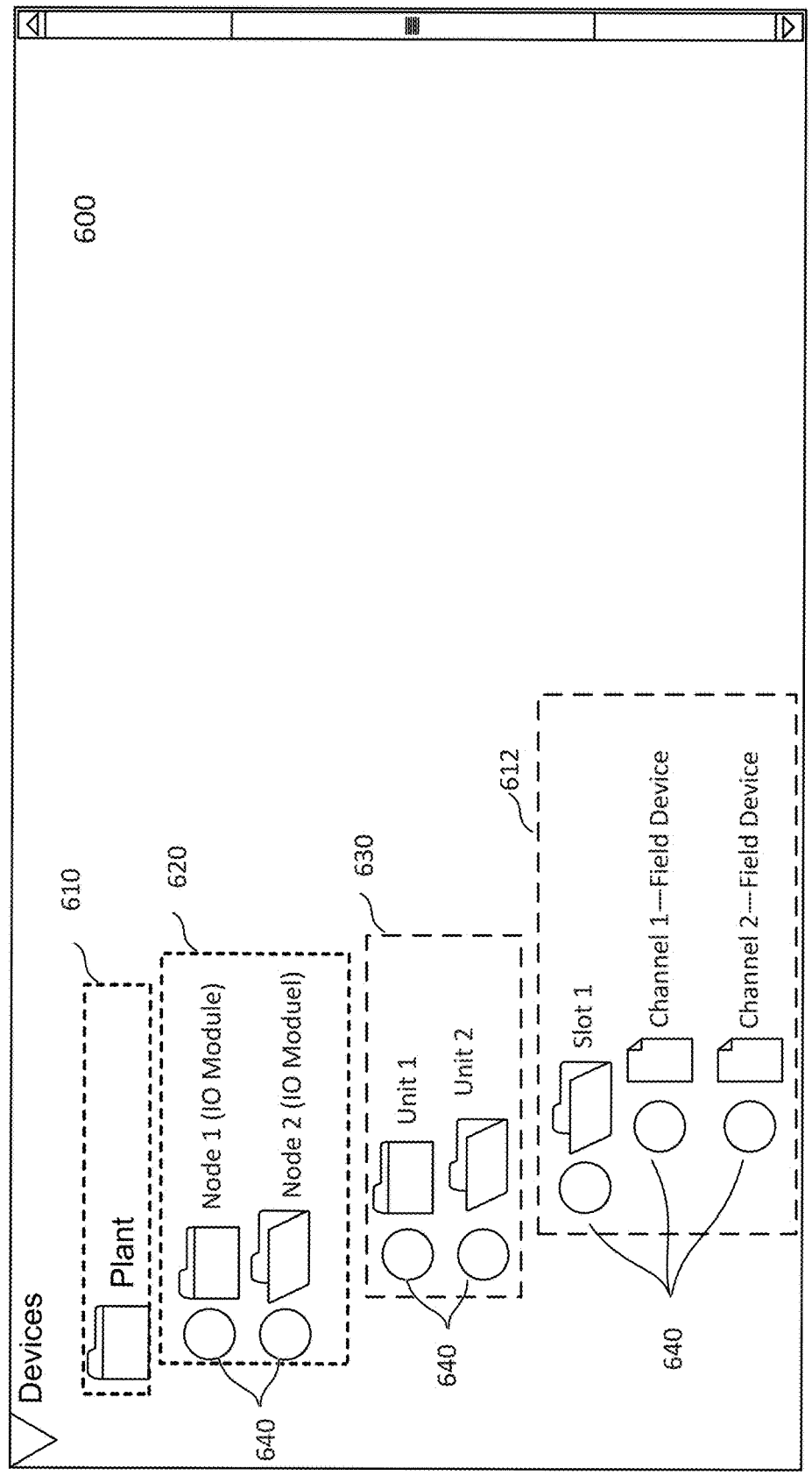
FIG. 6B is a view of another example of a display screen for execution report.

FIG. 6B illustrates an execution report according to some other embodiments. A display screen 600 shows an example tree view or hierarchy view of the field devices 430 and IO module 420. The industrial plant, project or area name 610 is shown at the top of the tree view. 620 lists the IO module, then 630 lists units under a node. 612 lists slots under a unit and channels that are connected with field devices 430. The hierarchy view is generated after user selection at Step S520 according to some embodiments of the invention. Alternatively, the hierarchy view is generated from the engineering data stored in the repository 440.

The execution results are shown in a status of the Node, the Unit, the Slot or the channels according to some embodiments of the invention. For example, the status is represented by icons 640 positioned next to the identifiers of the Nodes, the Units, the Slots and the channels. The icons 640 are shown in different forms or colors according to some embodiments of the invention. For example, "green" is reflected when the status for the execution is PASS; "grey" where there is a mismatch between the retrieved IO list from the repository and the retrieved field device tag from the field device 430; "red" means the status for the execution is FAIL. Fonts of the indicator icons can be different, indicating different status of the executions according to some embodiments of the invention.

The commissioning tool 400 is configured to provide a user selectable option to view the execution results in detail. The user selectable option is provided in a separate window which is triggered for display by a user according to some embodiments of the invention. Example of the execution results could be judgement time for each execution, a predefined threshold for determining status of executions, execution information and configuration parameters for IO module and field devices.

After validation of field device connection with the IO module 420 at Step S550, the executions are started with first selected Node. Each of slots contains a maximum of 16 channels. Each channel connects to a field device 430. If the connected field device is an input device, then the loop check for this channel is an input loop check. If the connected field device is an output device, then the loop check for the channel is an output loop check.

The execution sequence according to some embodiment of this invention is as follows: firstly, all the channels under a slot is executed in parallel; secondly, after execution of the first slot is completed, the execution moves to next slot in the same unit as the first slot; thirdly, after all the slots in the first unit are executed, loop check execution will move to the next unit; lastly, after all the channels under a unit are executed, loop check execution will move to the next available node.

Figure 7:
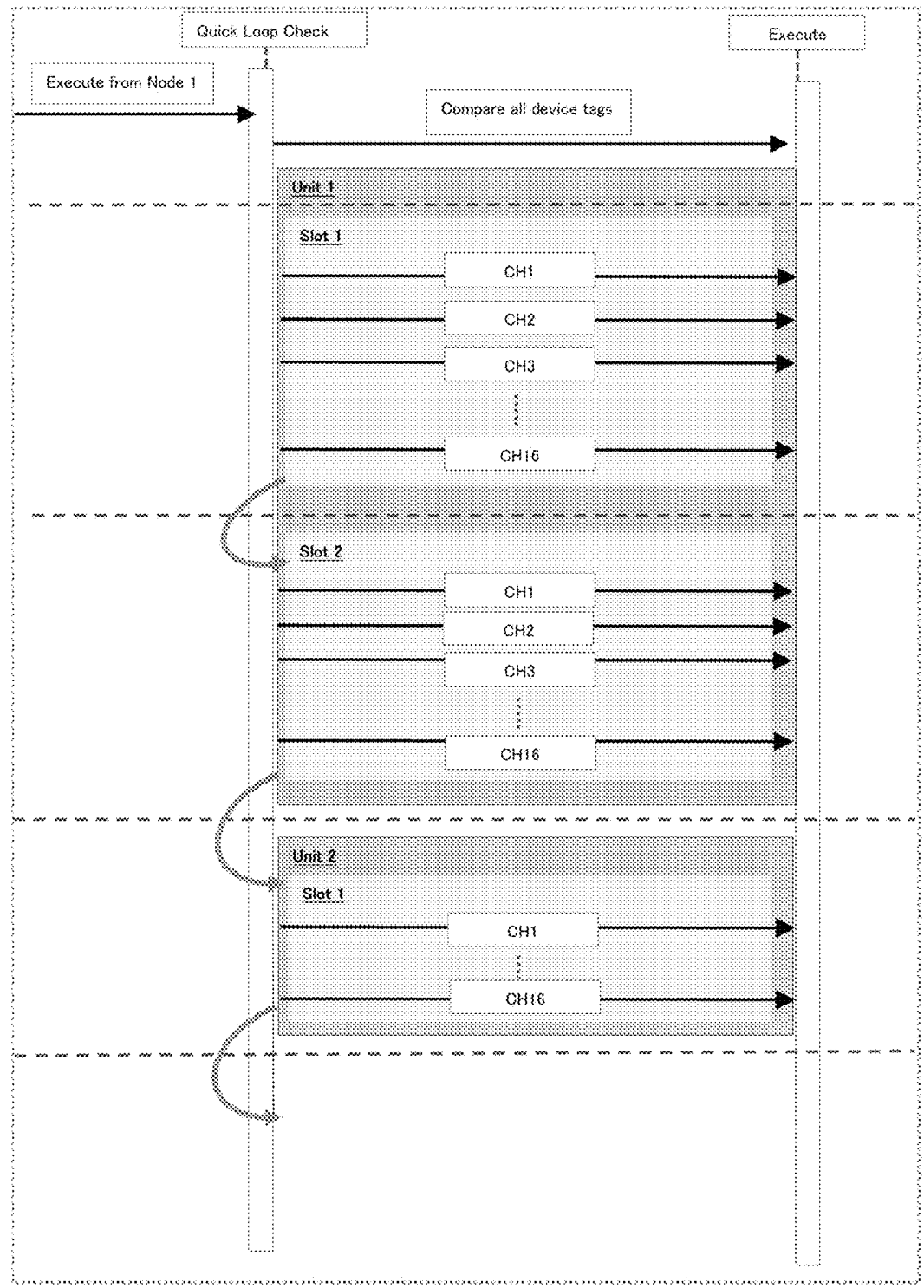
FIG. 7 illustrates field device loop check execution sequence per node.

As illustrated in FIG. 7, in some embodiments of this invention, each slot contains a maximum 16 channels. During execution, loop checks for these 16 channels are executed concurrently by supporting from TPL multi-threading. A main thread is from a slot to another slot. For example, a main thread is from unit 1 slot 1 to unit 1 slot 2 according to some embodiments. A child thread is dedicated to 1 channel. 16 child threads are spawn concurrently in parallel per slot. The dedicated child thread is responsible for all assigned operations to a particular channel while running a loop check.

The child thread joins the main thread after finishing all the operations for the channel. After all the channels within the first slot are executed, all child threads join the main thread. Then, loop check execution will move to next available slot as the main thread continues to the next slot. As shown in FIG. 7, within each slot, all channels are executed in parallel at same time. A plurality of slots are executed in sequential order. Execution for the next available slot starts only after execution for the first slot completed. Similarly, execution for a plurality of units are also in sequential order which is after the first unit completed, the execution for second unit starts.

Figure 8B:
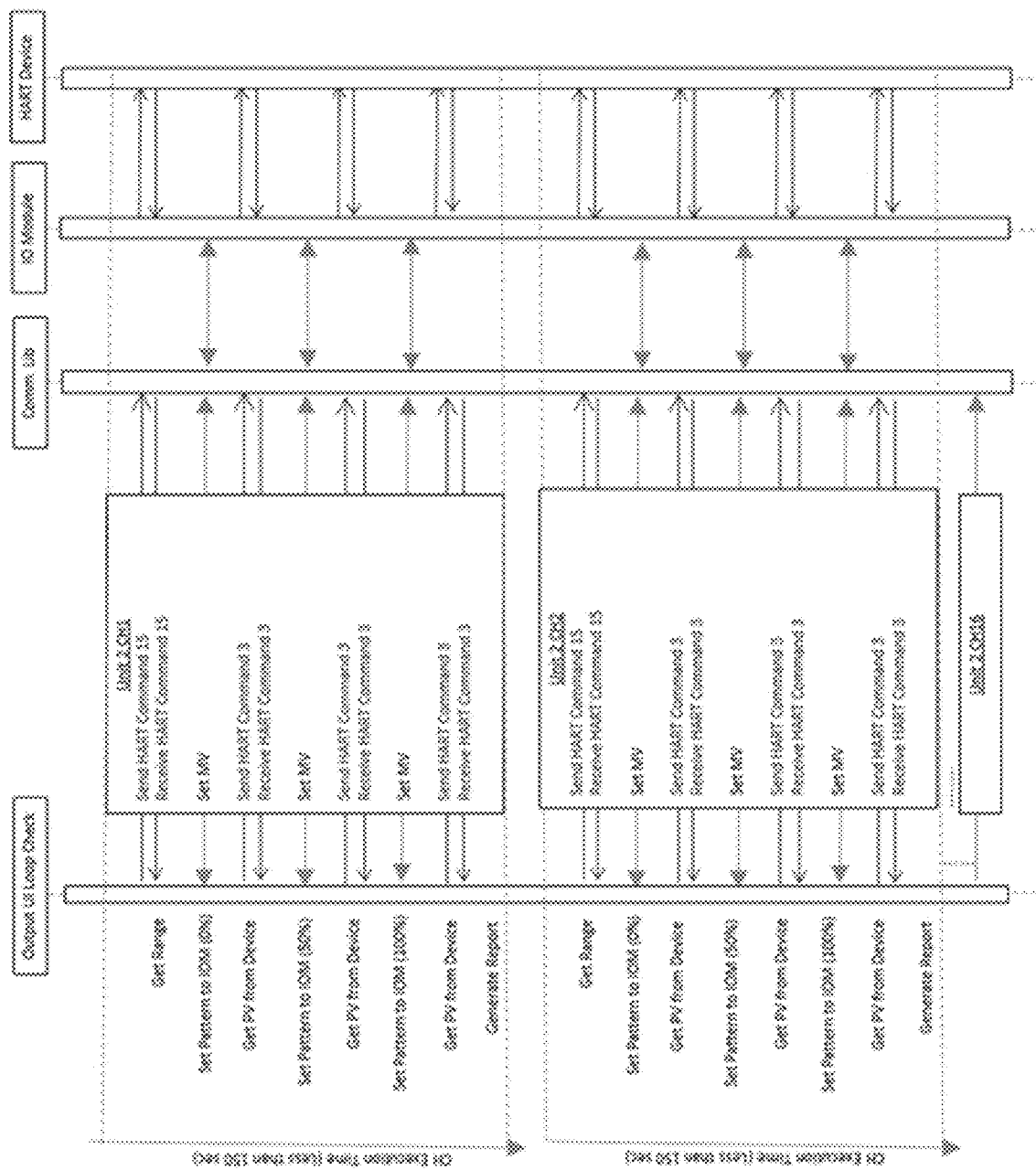

FIG. 8A and FIG. 8B show field device loop check parallel execution logics for input loop check and output loop check according to some embodiment of the invention, respectively.

Set Pattern: sending of patterns to write to device. Patterns values by default are 0%, 50% and 100% in some embodiments. The pattern values are stored in the repository 440. The user is able to modify the patterns values to other percentage or to add or to delete a pattern value. For example, patterns can be changed to 0%, 25%, 50%, 75% and 100%. The patterns are predefined by the user before the loop check execution as described.

Get PV from IO module: reading of signal value/process variable (PV) form the IO module.

Get PV from field device: reading of signal value/process variable (PV) from the field device.

To start a loop check execution for a channel, pattern values are set by the user. The patterns are either sent to the filed device 430 in an input loop check or set to the IO module in an output loop check.

In FIG. 8A, a three pattern example is used for illustration of an input loop check for a channel. In each of the input loop check, by the commissioning tool 400, a user sets a first pattern 0% to the input field device 430 (e.g. a temperature sensor) through the communication module 410. The commissioning tool reads a first PV from the IO module after setting the first pattern. Then, a second pattern 50% is set to the input field device. The commissioning tool reads a second PV from the IO module after setting the first pattern. Lastly, the third pattern 100% is set to the field device, and a third PV is read by the commissioning system from the IO module. After all patterns are set to the field device and all PVs are read from the IO module, status of the loop check task is determined by the commissioning tool 400. An execution report is generated, showing status of the input loop check task.

In FIG. 8B, another three pattern example is used for illustration of an output loop check (e.g. a valve) for a channel. In each of the output loop check, by the commissioning tool 400, a user sets a first pattern 0% to the IO module 420. The commissioning tool obtains a first PV from the output field device after setting the first pattern. Then, a second pattern 50% is set to the IO module 420. The commissioning tool obtains a second PV from the output field device after setting the second pattern. Lastly, the third pattern 100% is set to the IO module 420, and a third PV is read by the commissioning tool from the output field device. After all patterns are set to the IO module and all PVs are read from the output field device, status of the loop check task is determined by the commissioning tool 400. An execution report is generated, showing status of the output loop check task.

Figure 9:
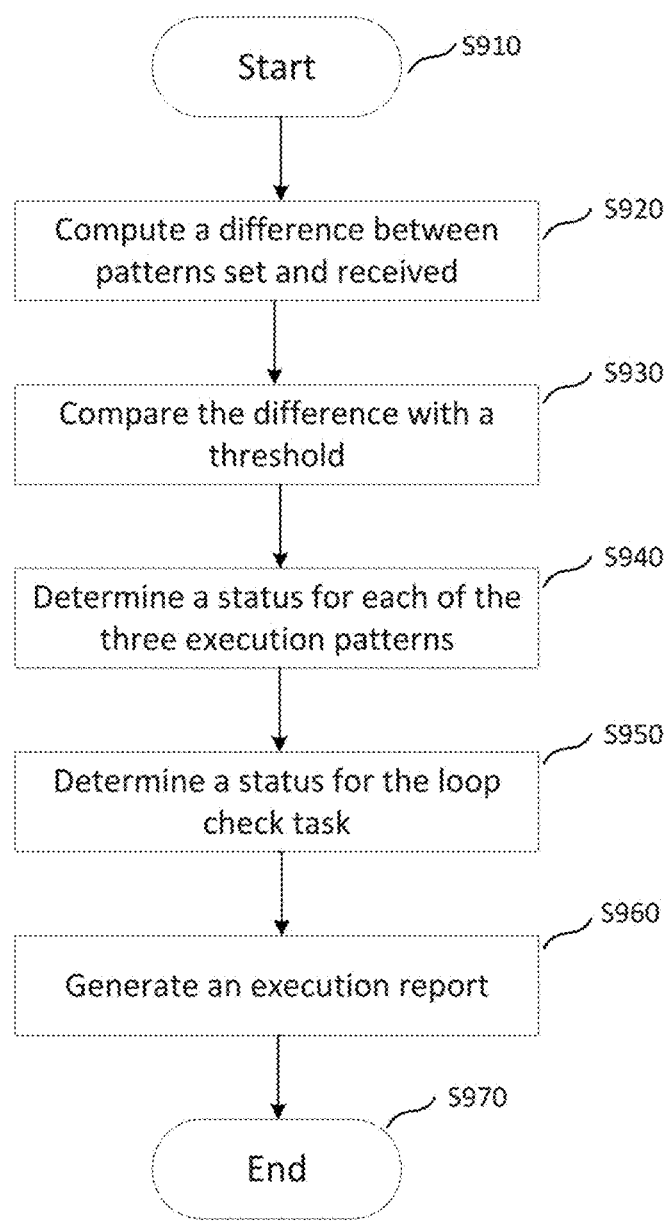
FIG. 9 is a flow chart of an example of sequential processes to generate an execution report for a loop check task according to some embodiment of the invention.

FIG. 9 illustrates a workflow to generate an execution report for a loop check task according to some embodiment of the invention. In Step S920, after setting a pattern set to an IO module or a field device and receiving a corresponding PV from a field device or an IO module, the difference between the patterns set and the received PV is computed by the commissioning tool 400.

In Step S930, the difference is compared with a threshold. The threshold is a default value stored in the repository 440 according to some embodiments of the invention. The threshold can also be configured by a user when a loop check task is generated and before execution of the task.

In Step S940, status of each of execution patterns for a channel is determined. When the difference is not greater than the threshold, the status of the pattern is determined to be PASS. When the difference is greater than the threshold, the status of the pattern is determined to be FAIL.

In Step S950, the status for the loop check task for the channel is determined based on the statuses of all the execution patters for the loop check. When the statuses for all the patterns are PASS, status for the loop check task for the channel is PASS. When at least one of the statuses for the patterns is FAIL, the status for the loop check task for the channel is FAIL. After the status for the loop check task is determined, an execution report is generated, including the loop check task status, and at least one of task information, field device information, IO module information and execution information.

In some other embodiments, judgement time is used to determine if the loop check task is PASS or FAIL. Judgement time is the time between the time of setting a pattern to an IO module/field device and the time of receiving a PV from a field device/an IO module. In first step, judgment time is determined for each of the execution patterns of a loop check task. Each of the judgement time is compared with a threshold. The status for an execution pattern is PASS when judgement time is not greater than the threshold value. The status for an execution pattern is FAIL when judgement time is greater than the threshold value. And, the status for the loop check task for the channel is determined based on the statuses of all the execution patters for the loop check.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer-implemented commissioning system comprising:
   a commissioning tool configured to communicate with a client and to perform a parallel execution of executing a plurality of loop processes that includes at least one input loop check or at least one output loop check in parallel for all of a plurality of channels which belong to each slot of a plurality of slots included in each unit of a plurality of units, in accordance with a plurality of requests for execution of loop checks from the client;
   the commissioning tool configured to perform in series a plurality of sequential executions for the plurality of the slots in each unit of the plurality of units, wherein each execution including the plurality of loop processes;
   the commissioning tool configured to perform in series the plurality of sequential executions for the plurality of units; and
   an input-output (IO) module configured to communicate with the commissioning tool, the IO module configured to communicate with a plurality of field devices,
   wherein the commissioning tool is configured to perform the parallel execution for each slot by retrieving predefined patterns and sending a plurality of sets of the patterns in parallel to the IO module, and the IO module is configured to send the plurality of sets of the patterns in parallel to the plurality of field devices, and
   wherein each of the input loop check or the output loop check for each channel includes:
   setting a first pattern to the field device;
   obtaining a first process variable (PV) from the IO module after setting the first pattern:
   setting a second pattern to the field device after obtaining the first PV;
   obtaining a second PV from the IO module after setting the second pattern;
   setting a third pattern to the field device after obtaining the second PV; and
   obtaining a third PV from the IO module after setting the third pattern.

2. The computer-implemented commissioning system according to claim 1, wherein a loop check task is a task performed to a channel.

3. The computer-implemented commissioning system according to claim 1, wherein the commissioning tool is configured to further perform at least:
   computing a difference between each of the execution patterns set to the field devices and their corresponding PVs obtained from the IO module;
   determining a check status of each of the execution patterns by comparing the difference with a predefined threshold;
   wherein the commissioning tool is configured to determine that the status is PASS when the difference is not greater than the predefined threshold; and
   wherein the commissioning tool is configured to determine that the status is FAIL when the difference is greater than the predefined threshold.

4. The computer-implemented commissioning system according to claim 3, wherein
   the commissioning tool is configured to determine that when the statuses for all the patterns are pass (PASS), status for the loop check task for the channel is PASS;
   the commissioning tool is configured to determine that when at least one of the statuses for the patterns is fail (FAIL) the status for the loop check task for the channel is FAIL.

5. The computer-implemented commissioning system according to claim 4, wherein the commissioning tool is configured to further perform at least:
   generating a notification on a user interface when the loop check task status is determined to be FAIL.

6. The computer-implemented commissioning system according to claim 1, wherein the commissioning tool is configured to further perform at least:
   determine judgement time by comparing time between setting a pattern to the field device and obtaining the corresponding PV from IO module with a predefined threshold; and
   comparing the judgement time with a predefined threshold;
   wherein the commissioning tool is configured to determine that status for the pattern is PASS when judgement time is not greater than the predefined threshold; and
   wherein the commissioning tool is configured to determine that status for the pattern is FAIL when judgement time is greater than the predefined threshold.

7. The computer-implemented commissioning system according to claim 3, wherein the predefined threshold is a default value or is configured by a user when a loop check task is generated and before execution of the task.

8. The computer-implemented commissioning system according to claim 1, wherein the commissioning tool is configured to further perform at least:
   importing and downloading configuration to IO modules;
   creating configured input and output loop check task; and
   comparing IO module list and field device tags.

9. The computer-implemented commissioning system according to claim 5, wherein the commissioning tool is configured to further perform at least:
   generation of an execution report, which includes loop check task status, and at least one of task information, field device information, IO module information, execution information.

10. A computer-implemented commissioning method comprising:
    communicating, by a commissioning tool with a client;
    receiving, a plurality of requests for executions of loop checks from the client;
    performing, by the commissioning tool, a parallel execution of executing a plurality of loop processes that includes at least one input loop check or at least one output loop check in parallel for all of a plurality of channels which belong to each slot of a plurality of slots included in each unit of a plurality of units, in accordance with a plurality of requests for execution of loop checks from the client;

performing, by the commissioning tool, in series a plurality of sequential executions for the plurality of the slots in each unit of the plurality of units, wherein each execution including the plurality of loop processes;

performing, by the commissioning tool, in series the plurality sequential executions for the plurality of units;

communicating, by an input-output (IO) module, with the commissioning tool; and communicating, by the IO module, with the plurality of field devices, wherein performing, by the commissioning tool, the parallel execution for each slot includes:

retrieving, predefined patterns for selected loop check channels;

sending, a plurality of sets of the patterns in parallel to the IO module; and sending, by the IO module, the plurality of sets of the data in parallel to the plurality of field devices, and wherein each of the at least one input loop check and the at least one output loop check for each channel includes:

setting, a first pattern to the field device;

obtaining, a first process variable (PV) from the IO module after setting the first pattern;

setting a second pattern to the field device after obtaining the first PV;

obtaining, a second PV from the IO module, after setting the second pattern;

setting, a third pattern to the field device after obtaining the second PV; and obtaining a third PV from the IO module after setting the third pattern.

11. The computer-implemented commissioning method according to claim 10, wherein a loop check task is a task performed to a channel.

12. The computer-implemented commissioning method according to claim 10, further comprising:

computing, a difference between each of the patterns set to the field device and their corresponding PVs obtained from the IO module;

determining, a status of each of the patterns by comparing the difference with a predefined threshold;

determining, the status to be pass (PASS) when the difference is not greater than the predefined threshold; and determining, the status to be fail (FAIL) when the difference is greater than the predefined threshold.

13. The computer-implemented commissioning method according to claim 12, wherein determining, status for the loop check task is PASS when the statuses for all the loop check patterns are PASS;

determining, status for the loop check task is FAIL when at least one of the statuses for all the loop check patterns is FAIL.

14. The computer-implemented commissioning method according to claim 13, further comprising:

generating, a notification on a user interface when the loop check task status is determined to be FAIL.

15. The computer-implemented commissioning method according to claim 10, further comprising:

determining, a judgement time by comparing time between setting a pattern to the field device and obtaining a corresponding PV from IO module with a predefined threshold;

determining the status for the pattern to be PASS when judgement time is not greater than the predefined threshold; and determining the status for the pattern to be FAIL when judgement time is greater than the predefined threshold.

16. The computer-implemented commissioning method according to claim 12, wherein the predefined threshold is a default value or is configured by a user when a loop check task is generated and before execution of the task.

17. The computer-implemented commissioning method according to claim 10, further comprising:

importing and downloading configuration to IO module;

creating input and output loop check task; and comparing IO module list and field device tags.

18. The computer-implemented commissioning method according to claim 14, further comprising:

generating of an execution report, includes loop check task status, and at least one of, task information, field device information, IO module information, execution information.

19. A non-transitory computer readable storage medium that stores a computer-readable program which, when executed by one or more computers, causes the one or more computers to perform a method comprising:

communicating, by a commissioning tool, with a client;

receiving a plurality of requests for execution of a plurality of loop checks from the client;

performing, by the commissioning tool, a parallel execution of executing a plurality of loop processes that includes at least one input user loop check or at least one output loop check in parallel for all of a plurality of channels which belong to each slot of a plurality of slots included in each unit of a plurality of units, in accordance with a plurality of requests for execution of loop checks from the client;

performing, by the commissioning tool, in series a plurality of sequential executions for the plurality of the slots in each unit of the plurality of units, wherein each execution including the plurality of loop processes;

performing, by the commissioning tool, in series the plurality sequential executions for the plurality of units;

communicating, by an input-output (IO) module, with the commissioning tool; and communicating, the IO module, with the plurality of field devices, wherein performing, by the commissioning tool, the parallel execution for each slot includes:

retrieving, predefined patterns for selected loop check channels;

sending, a plurality of sets of the patterns in parallel to the IO module; and sending, by the IO module, the plurality of sets of the data in parallel to the plurality of field devices, wherein each of the at least one input loop check and the at least one output loop check for each channel includes:

setting, a first pattern to the field device;

obtaining, a first process variable (PV) from the IO module after setting the first pattern;

setting a second pattern to the field device after obtaining the first PV;

obtaining, a second PV from the IO module, after setting the second pattern;

setting, a third pattern to the field device after obtaining the second PV; and obtaining a third PV from the IO module after setting the third pattern.

\* \* \* \* \*